(12) United States Patent
Basford

(10) Patent No.: US 7,596,877 B2
(45) Date of Patent: Oct. 6, 2009

(54) MASON'S ADJUSTABLE ALIGNMENT TOOL

(76) Inventor: Clifford W. Basford, 138 Main St., Essex, MA (US) 01929

( * ) Notice: Subject to any disclaimer, the term of this patent is extended or adjusted under 35 U.S.C. 154(b) by 0 days.

(21) Appl. No.: 11/985,278

(22) Filed: Nov. 14, 2007

(65) Prior Publication Data

US 2008/0115453 A1    May 22, 2008

Related U.S. Application Data

(60) Provisional application No. 60/859,601, filed on Nov. 17, 2006.

(51) Int. Cl.
*G01B 1/00* (2006.01)
*G01C 15/10* (2006.01)

(52) U.S. Cl. .......................... 33/518; 33/404
(58) Field of Classification Search ................ 33/518, 33/427–429, 419, 404, 407–408
See application file for complete search history.

(56) References Cited

U.S. PATENT DOCUMENTS

| 70,547 | A | * | 11/1867 | Graham | 33/419 |
|---|---|---|---|---|---|
| 164,008 | A | * | 6/1875 | Kirkpatrick | 33/427 |
| 420,443 | A | * | 2/1890 | Delancett | 33/419 |
| 523,398 | A | * | 7/1894 | Gorman | 33/419 |
| 752,823 | A | * | 2/1904 | Cary | 33/427 |
| 1,653,561 | A | * | 12/1927 | Gray | 33/419 |
| 1,863,236 | A | * | 6/1932 | Brienza | 33/427 |
| 2,286,669 | A | | 6/1942 | Carr | |
| 2,585,283 | A | | 2/1952 | Sommers | |
| 3,102,339 | A | | 9/1963 | Pagona | |
| 3,271,867 | A | * | 9/1966 | Morris | 33/419 |
| 3,961,552 | A | * | 6/1976 | Graham | 83/821 |
| 4,064,632 | A | | 12/1977 | Waldecker | |
| 4,882,846 | A | * | 11/1989 | Reed | 33/464 |
| 5,095,633 | A | | 3/1992 | Barnett | |
| 5,263,260 | A | | 11/1993 | Smith | |
| 5,761,876 | A | * | 6/1998 | Keady | 33/406 |
| 6,367,227 | B1 | * | 4/2002 | Veyna | 33/410 |
| 6,769,190 | B2 | * | 8/2004 | Carlisle | 33/427 |
| 7,461,461 | B2 | * | 12/2008 | Howell | 33/404 |
| 2002/0170189 | A1 | | 11/2002 | Cheatham | |
| 2003/0101607 | A1 | * | 6/2003 | Carlisle | 33/427 |

* cited by examiner

*Primary Examiner*—Yaritza Guadalupe-McCall
(74) *Attorney, Agent, or Firm*—Donald N. Halgren; Jeffrey T. Spangler

(57) ABSTRACT

A stone wall alignment tool for checking the plumbness of a stone wall during construction thereof. The tool comprises a first "L" shaped bracket having a long leg and a short side leg. The tool also comprises a second "L" shaped bracket having a long leg and a short side leg, wherein the long legs of the first and the second brackets are slidably and lockingly adjustable with respect to one another, and wherein the long legs are arranged to be disposed on top of a wall and its side legs are arranged to be disposed on the sides of the stone wall as a plumb-alignment-tool during the wall's construction.

1 Claim, 6 Drawing Sheets

MASON'S ADJUSTABLE ALIGNMENT TOOL

FIELD OF THE INVENTION

This invention relates to an adjustable wall "plumbing" tool to facilitate the assembly of a stone wall or a stone column using greater efficiency and speed, and is based upon and claims priority from Provisional Patent Application Ser. No. 60/859,601, filed 17 Nov. 2006, and is incorporated herein by reference in its entirety.

BACKGROUND OF THE INVENTION

Builders of stone walls and stone structures such as pillars and columns have been around as long as man and stone have shared the Earth. These architects have developed a variety of methods for building their stone memorials, many of which have been standing for thousands of years. The tools most common to the trade are a simple hammer and square, and with these two tools, stone masons have erected monuments such as the Pyramids.

The necessity for the present invention of a mason's width gauge arose when the inventor was asked by a client to build a freestanding fieldstone wall thirty feet long and seven feet high. Ordinarily, such a wall would be built according to the prior art, wherein plumb bobs and lines would be set up as guides enabling the mason to build his wall from both sides.

But in this case, the inventor was asked to build the wall only three inches from a neighbor's boundary fence, making it impossible to work on one side of the wall facing the neighbor's property. The inventor, being a perfectionist, was not willing to settle for anything less than a wall that was perfectly plumb on both sides. The problem with the neighbor's fence challenged him to solve it and build a plumb wall on both sides while working from only one.

Perplexed by the problem facing him, he noticed his framing square laying on the ground, so he decided to use two simple framing squares. He shortened the long vertical leg of the ninety degree angle, then attached the two squares together to the desired width of the wall to be built. This is based upon the simple geometric principle declared by Euclid sometime between 450 and 374 B.C.E. stating that a straight line continues forever.

The boundary fence three inches away did not prevent him from laying four solid eight-inch concrete blocks and making them plumb at the four corners of the freestanding wall he was about to build. He set them in mortar, and plumbed each one using a conventional level. He then attached four horizontal lines to a simple device called a line block which enables a mason to attach the line to the concrete blocks.

The line blocks with attached lines were placed on the four concrete blocks, with one line extending from the bottom of each block, and on the top of each block horizontally, giving him a guide for the bottom of the stone as well as the top, making the first course of stone plumb. Using this method, he was able to establish the first one-foot course of stone on both sides of the freestanding wall about to be built.

After the first course was plumb, and applying the principle that a straight line continues forever, the inventor used his modified combination of the framing squares with the shorter vertical leg on one (back) side; and he was able to build his wall perfectly plumb on both sides to the desired height in the following manner.

The long leg of the device is held against the already plumb first course of stone, and the mason then sets a course of stone opposite the long vertical leg on the side with the short leg, bringing the stone over to the short leg, plumbing it by eye as closely as possible, then checking to assure it is plumb using the long vertical leg extending below the newly laid second course of stone to the previously plumb first course. The first course was plumbed using the prior art of concrete blocks and lines, by holding the long leg flush with the first course of stone, allowing the mason to align the second course vertically with the first.

The short leg allows the mason to freely move the invention around the wall without the hindrance of using two squares attached to each other with two long legs. The short leg is one aspect of novelty which distinguishes this invention from prior art.

Having successfully built his freestanding wall seven feet high and thirty feet long perfectly plumb, and having received a new job to build a two-feet square pillar seven feet tall; the inventor then tested his invention with pillars. He made a simple wooden template using two-by-four lumber and attached it to form a square template with the inside dimension measuring two feet by two feet.

The inventor then laid the first one-foot course of stone inside the wooden template, and using a conventional level, plumbed the first course of stone as he did with the free standing wall, and built the pillar without any difficulty whatsoever. The prior art for pillars consisted of setting up an approximately square structure over the site where the pillar was to be erected, then dropping plumb lines with plumb bobs from that structure to the four corners of the pillar.

In the prior art, the plumb lines were attached to the first course of stone which had been set without the line. These lines enabled the mason to build the pillar without the continual checking with the conventional two foot and four foot level which skilled masons normally use. Not having to check with a level repeatedly for each course of stone speeds up building the pillar. The prior art structure built above the pillar site typically consisted of conventional staging made of pipe frames attached to each other using brackets, which suspended the plumb lines to the four corners of the pillar, but which were obstacles for the mason.

These obstacles require the mason to duck and walk in and out of the structure, coupled with his inability to place all the stone he needs for building the pillar close by, and easily accessible, without having to walk in and out of the structure needed to hold the plumb lines. Typically a mason will place all his stone on the ground around him in such a way that he can see all the faces that he wants facing out on the four sides of the pillar. Staging and other such structures prove to be a hindrance and an obstacle imposing a limitation on the mason's ability to build a plumb pillar easily and comfortably, without having any accidents such as banging his head against the structure supporting the plumb lines or tripping over things.

The present invention, a unique application of the square used by masons for centuries, eliminates all these problems and allows the mason free and easy movement, thus increasing his speed building the pillar or wall. This tool literally cut off several days of painstaking labor required to build a freestanding wall or pillar. The device eliminates the need to move lines up or down to their desired position repeatedly throughout the construction of a wall, saving the mason much time and effort.

It is an object of the present invention, to overcome the disadvantages of the prior art.

It is a further object of the present invention, to provide a tool assembly which can be adjusted to fit most thicknesses or dimensions of walls or pillars being constructed by a mason.

It is still yet a further object of the present invention to provide a mason's tool for the construction of a stone wall or pillar without the continuous need of plumb lines and guidelines or always checking the structure with a level.

BRIEF SUMMARY OF THE INVENTION

The present invention relates to a mason's adjustable alignment tool assembly utilizable in the manufacture and assembly of stone walls and stone pillars or the like. Such an alignment tool is comprised of a first "L" shaped bracket and a second "L" shaped bracket. The first bracket has a first long leg and a first side leg arranged at a 90 degree angle with respect to the long leg thereof. The first bracket is made of sheet metal, preferably having a long leg measuring for example, about at least about 24 inches, as measured along its outer edge. The first bracket side leg arranged perpendicular to the first bracket long leg, is shorter, critically no longer than for example, 6 inches, as measured along its outer edge. A pair of elongated slots or a series of spaced-apart holes may be arranged longitudinally in the long leg of the first bracket to provide connecting and adjustable measurement capacity between the first bracket and a second bracket.

The alignment tool, as noted above, also includes a second bracket consisting of a long leg and a side leg arranged perpendicular to the long leg. The long leg of the second bracket is for example, at least about 24 inches long, as measured along its outer edge, and the side leg of the second bracket is critically considerably longer than the first bracket side leg for facilitating "front face of wall" alignment. That is, the second bracket side leg is critically at least 16 inches long, as measured along its outer edge.

The long leg of the second bracket preferably has an elongated slot therein, or alternatively, a plurality of spaced-apart openings arranged thereon. The first and second brackets are arranged so that their respective long legs are in a sliding relationship with one another wherein their respective slots therein or alternatively, their holes or openings may be in longitudinal adjacent alignment to receive and adjustably lock their respective long legs together by a securement means mated therebetween.

At least two adjustable securement clips are insertably arrangeable between the respective elongated slots and/or any two of the adjustment holes or openings in their respective adjacent long legs of the first and second brackets to adjustably hold the first and second brackets together.

When it is desired to construct a stone wall, the stone mason will typically arrange a bed or foot of the stone wall and set at least a first row or course of stones horizontally therealong. By getting the first initial array of foundation type stones in a "plumb" array, by a level or plumb line or the like, that plumb line or level may then be set aside for the remaining duration of the construction.

As the wall is constructed, the desired width of that wall is adjustably preset between the first and second brackets and locked into that position by the several securement clips negotiated through the adjacent respective elongated slots or the adjustment holes in the long leg of the first bracket and the long leg of the second bracket, to its desired width-of-wall setting.

As additional stones are set in place, the alignment tool may be placed thereover with the long legs defining the horizontal top of the wall being constructed. The first bracket having its shorter side leg facilitates movement and adjustment of that alignment tool off and back onto the wall (preferably the backside) as it is constructed. This is important because the back or rearside of the wall is often backfilled and a long leg on the first bracket would likely not have the depth on that rear side of the wall to accept the longer leg of the first bracket. The long side leg of the second bracket is placed against the front side of the wall being constructed to provide for proper plumb alignment of the "face" of that wall. As an added measure, a bubble level may be arranged on at least one of the generally horizontally disposed long legs of either the first or the second bracket.

Such an adjustable alignment tool may also be utilized during the construction of a pillar or column of stone or the like. After the lower course of stones is in place, and plumbed in the traditional matter, the mason's adjustable alignment tool may then be utilized to properly gauge the dimensions and plumbness of the pillar along all four sides thereof.

As the width alignment tool is utilized for walls, all of the legs, that is the side leg and the long leg of each of the first and second brackets of each of the alignment tools may all have elongated alignment slots or holes therethrough, so as to permit an overlap of a first bracket assembly and a second bracket assembly of each tool mating with an appropriate corresponding second bracket and first bracket of an adjacent alignment tool. Such a compound use of a pair of alignment tools permits a pillar to be constructed by the appropriate size from its lower level to its uppermost level.

During its use, it is intended that the second bracket's longer side leg be disposed against the face side of any wall being assembled. The side leg of the second bracket with its longer length is intended to be flush over the stone as it is used to plumb and align the face of the wall. In an assembly of a pillar, such a single adjustable alignment bracket may be also utilized to insure the conformance of the plumbness of the side walls of that pillar when that alignment tool is placed over the top side of the pillar as appropriate courses are laid thereon.

Thus what is shown is a unique adjustable alignment tool for masons when they assemble a stone wall or a stone pillar while eliminating use lines or plumb bobs after the first course has been laid plumb.

The invention thus comprises a stone wall alignment tool arrangement for determining the plumbness of a stone wall during construction thereof. The tool comprises a first "L" shaped bracket having a long leg and a short side leg, a second "L" shaped bracket having a long leg and a short side leg, wherein the long leg of the first and the second brackets are slidably and lockingly adjustable with respect to one another, wherein the long legs are arranged to be disposed on top of a wall and its side legs are arranged to be disposed on the sides of the stone wall as a plumb alignment tool during the wall's construction. The brackets have adjustable securement means on its long legs to permit widthwise adjustment of the tool on a wall being constructed. The long leg of the first bracket and the long leg of the second bracket are preferably equal in length. The short leg of the first bracket is shorter than the short leg of the second bracket, to facilitate use of the alignment tool on a stone wall which may have a backfill or an obstruction or fence or the like, thereagainst. Each of the long legs of each of the brackets preferably have an elongated slot or alternatively a series of spaced apart holes arranged longitudinally therealong to permit the securement means to extend therethrough to permit dimensional adjustment and securement therebetween. Each of the slots in the long legs of each of the brackets extend from a point on their long leg which is in alignment with an inside edge of their respective side leg, to a position about one inch from a distal end of their respective long leg. The securement means preferably comprises a securement clip which may be comprised of a rotatable knob and stud rotatably received through a first gripping plate on a front side of the tool, and into threaded receiving engagement with a second gripping plate disposed against a rear side of the tool.

The invention also comprises A stone wall alignment tool assembly for establishing a proper plumb base of a stone pillar construction, comprising an alignment tool, said alignment tool comprising a first "L" shaped bracket and a second "L" shaped bracket, said first bracket and said second "L" shaped bracket having a long leg and a short leg, wherein said short leg of said first bracket is shorter than said short leg of said second bracket to facilitate constructed of a stone structure obstructed on a back side thereof.

The invention also comprises a stone wall alignment tool assembly wherein the long legs of each of the brackets have a correspondingly located elongated slot therein to permit securable adjustable attachment of the first bracket to the second bracket. The short leg of the second bracket is at least twice as long as the short leg of the first bracket. The short leg of the first bracket is no longer than 6 inches. The long legs of the first bracket and the second bracket are preferably same length.

The invention also comprises a method of building a stone wall comprising one or more of the following steps: laying a first layer of stones, leveled by a level, as a base of the wall; laying a series of subsequent layers of stones upon said first layer of stones, and placing a first and a second adjustably connected "L" shaped bracket over each of the layers of the series of subsequent layers of stones to facilitate plumbness of a front face of the wall by a long side leg of one of the "L" shaped brackets; placing a short side leg of the first of the "L" shaped brackets over a rear face of the wall to facilitate "dimensioning" and "plumbing" of the wall and permitting easy placement and subsequent removal of the adjustably connected brackets in a wall with an obstruction thereadjacent. The method may include: adjusting the positioning of the first of the "L" shaped brackets with respect to the second of the "L" shaped brackets by loosening and tightening a securement means disposed between a main leg of each of the "L" shaped brackets upon the desired positioning therebetween.

BRIEF DESCRIPTION OF THE DRAWINGS

The objects and advantages of the present invention will become more apparent when viewed in conjunction with the following drawings in which.

DETAILED DESCRIPTION OF THE PREFERRED EMBODIMENTS

Figure 1:
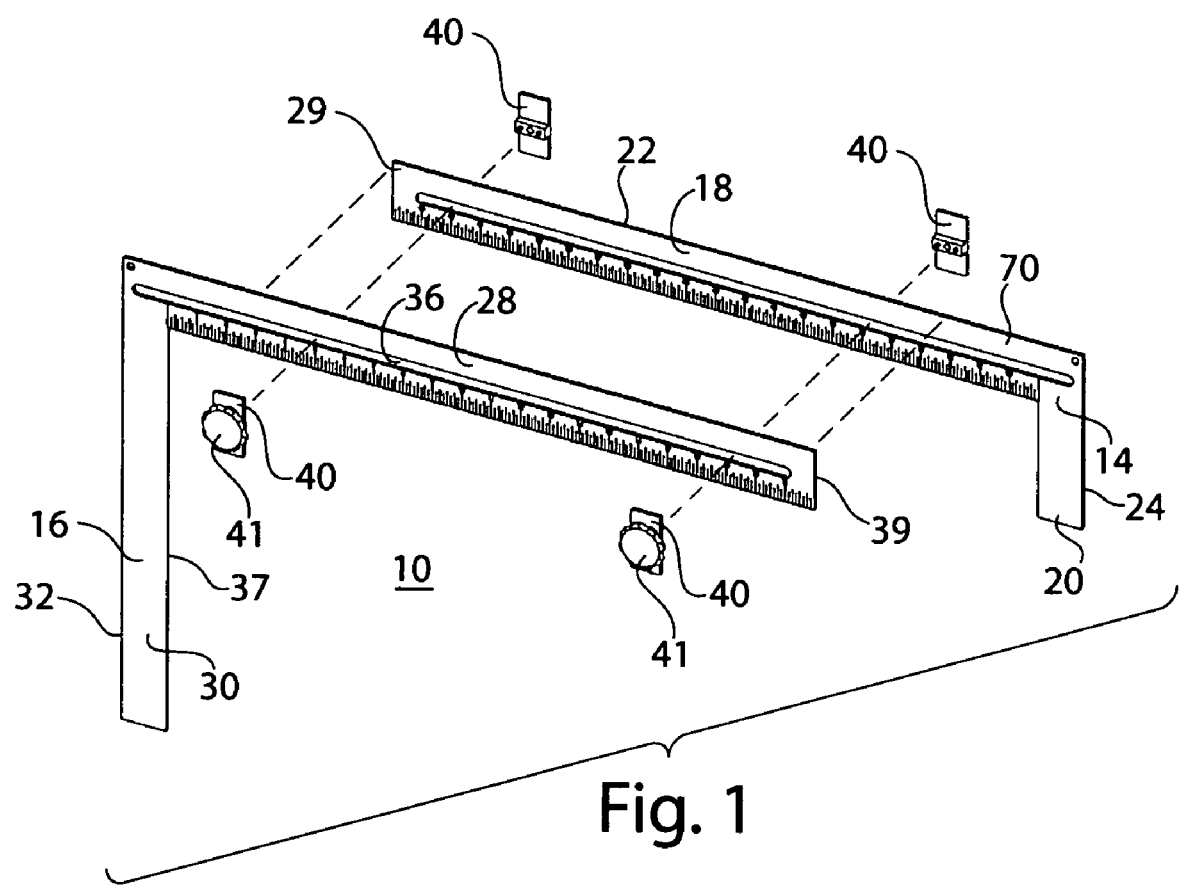
FIG. 1 is an exploded perspective view of a mason's adjustable alignment tool for arrangement over the top side, the front and rear faces of a stone wall under construction.
Figure 2:
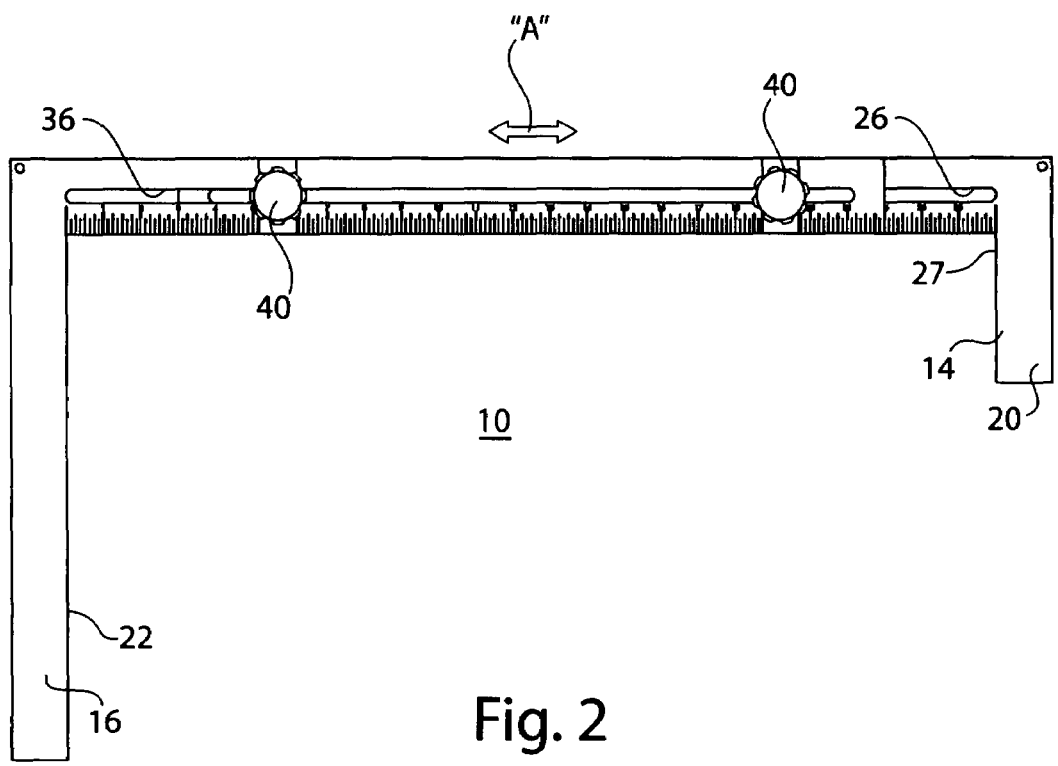
FIG. 2 is a side elevational view of the mason's adjustable alignment tool shown in FIG. 1.
Figure 3:
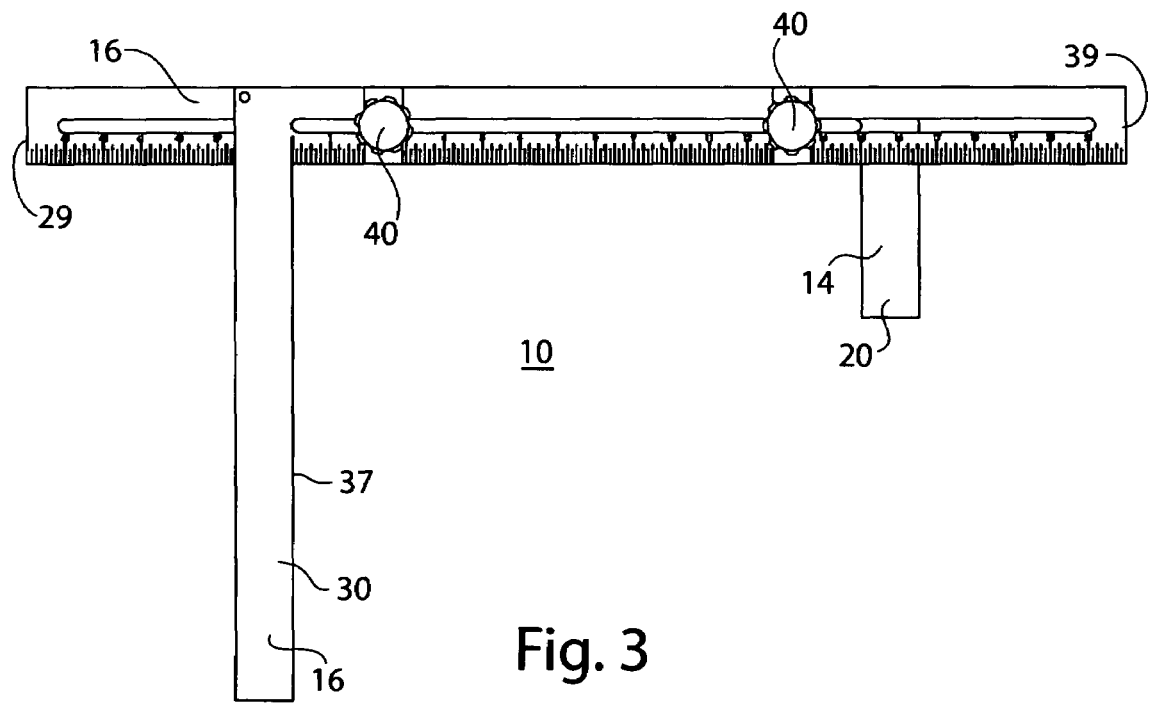
FIG. 3 is a side elevational view of the alignment tool shown in FIG. 2, with the components thereof, adjusted with respect to one another.
Figure 5:
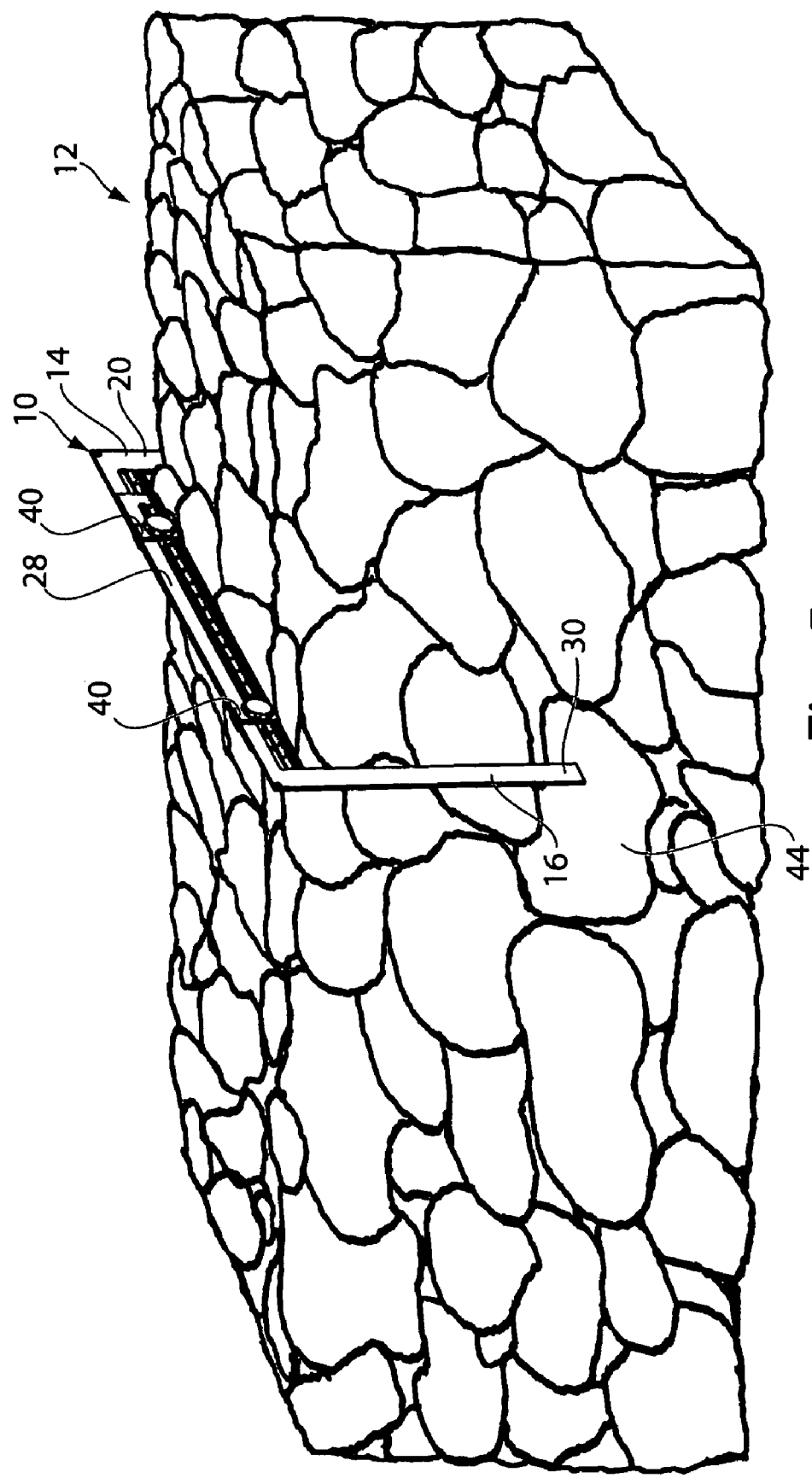
FIG. 5 is a perspective view of a mason's adjustable alignment tool shown arranged over the top side, the front and rear faces of a stone wall under construction.
Figure 6:
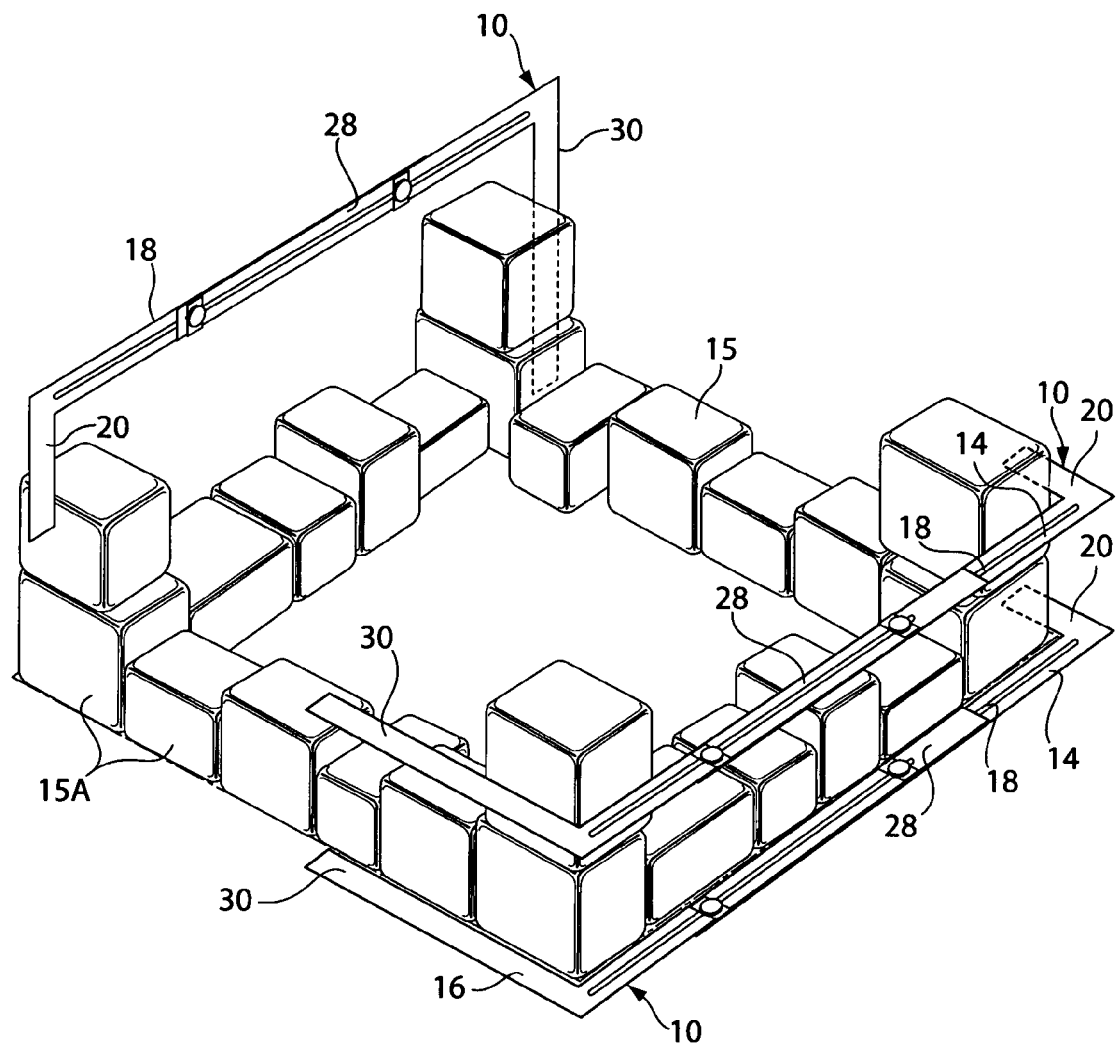
FIG. 6 is a perspective view of several adjustable alignment tools displaying a manner in which they may be utilizable in the assembly of a stone pillar.

Referring now to the drawings in detail, and particularly to FIG. 1, there is shown the present invention in an "exploded" view, which comprises a mason's adjustable alignment tool 10, and as also shown in several adjusted positions of the tool 10 in FIG. 2 and in FIG. 3. The adjustable alignment tool 10 is utilizable in the manufacture and assembly of a stone wall 12, as represented in FIG. 5, and in an initial "in-construction" stone pillar 15 or the like, as represented in FIG. 6.

Such an alignment tool 10 is comprised of a first L-shaped bracket 14 and a second L-shaped bracket 16, as shown in exploded format in FIG. 1, and in a first adjusted enlarged position in FIG. 2, and as shown in an adjustably reduced length representation in FIG. 3.

The first bracket 14 has a first main or long leg 18 and a first side leg 20 arranged at a 90 degree angle with respect to the long leg 18 thereof (the "L" shape). The first bracket 14 is preferably made of sheet metal, having its long leg 18 measuring about at least about 24 inches, as measured along its outer edge 22. The first bracket side leg 20 is arranged perpendicular to the first bracket's long leg 18, is shorter, critically no longer than 6 inches, as measured along its outer edge 24 to facilitate placement and removal thereof from the backside of a wall under construction, which backside may have been "back-filled" or access thereto obstructed. An elongated slot 26 is arranged longitudinally on the main or long leg 18 of the first bracket 14, from a location approximately in line with the inner edge 27 of the side leg 20, up to about an inch from the distal end 29 of the long leg 18, to provide maximum connecting and adjustable measurement capacity between the first bracket 14 and the second bracket 16.

The alignment tool 10, as noted above, also includes that second bracket 16, best shown in FIGS. 1 through 4, consisting of a main or long leg 28 and a side leg 30 arranged perpendicularly to the long leg 28. The main or long leg 28 of the second bracket is at least 24 inches long, as measured along its outer edge 32. The side leg 20 of the first bracket 14 is shorter than the side leg 30 of the second bracket 16, for critical purposes of maneuverability with respect to a stone wall, often having a "filed-in" or an obstructed back side. That is, the second bracket's 16 side (short) leg 30 is critically at least about 16 inches long, as measured along its outer edge 32 to facilitate the plumbness of a good portion of the front side of a wall 12 or pillar 15 under construction.

The long leg 28 of the second bracket 16 has an elongated slot 36 arranged thereon, as best represented in FIGS. 1 through 4. The length of the slot 36 in the lone leg 28 of the second bracket 16 is preferably at least equal to the length of the slot 26 in the long leg 18 of the first bracket 14, that is, it extends from a location approximately in line with the inside edge 37 of the side leg 30 up to about an inch from the distal end 39 of the long leg 28, as may be seen in FIG. 1. The first and second brackets 14 and 16 are arranged so that their respective long legs 18 and 28 are in an adjustable, lockable, sliding relationship with one another, as represented by arrows "A" in FIG. 2, wherein their respective elongated slots 26 and 36 may be adjacently aligned to receive and longitudinally adjustably lock those long legs 18 and 28 together.

At least two adjustable securement clips 40, represented in FIGS. 1, 2, 3 and 4, are insertably arrangeable at any longitudinally spaced apart location between the adjacently aligned adjustment slots 26 and 36 in their respective adjacent long legs 18 and 28 of the first and second brackets 14 and 16, to adjustably hold the first and second brackets 14 and 16 together.

Figure 4:
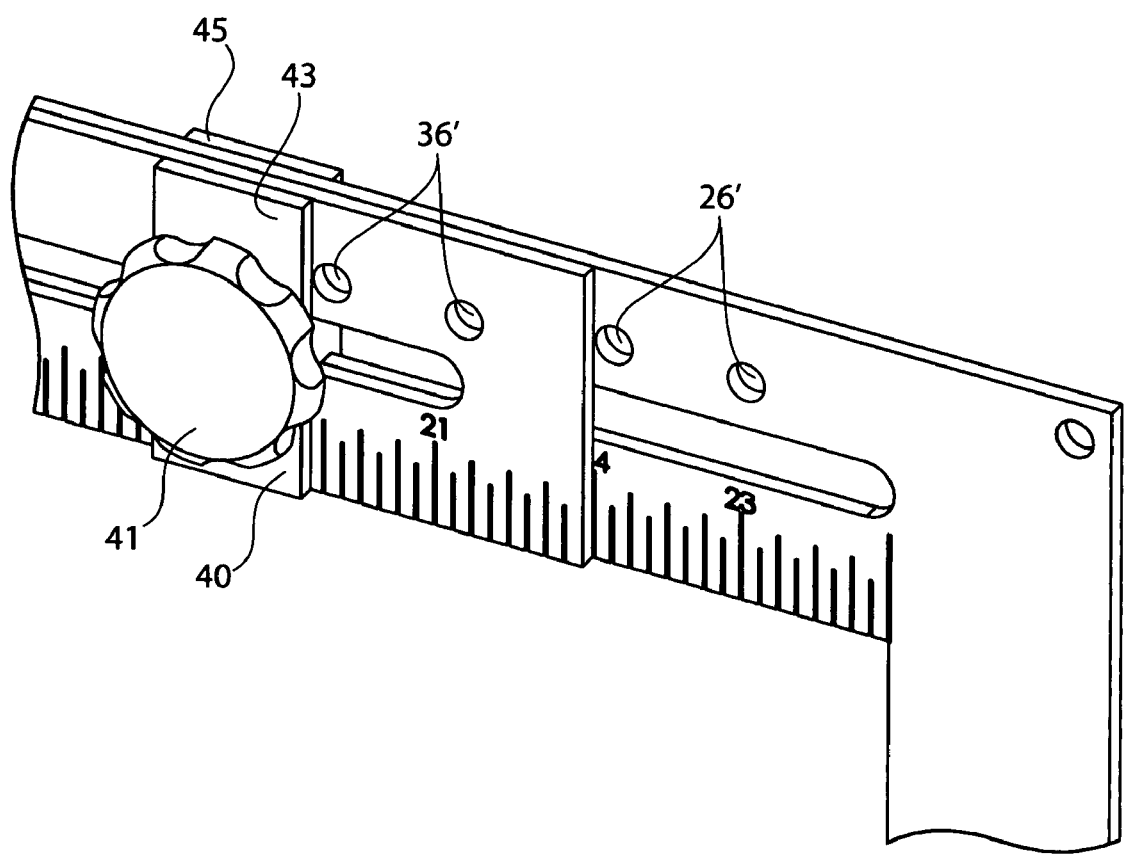
FIG. 4 is a perspective view of a portion of the components of the adjustment tool, showing a securement means thereof.

Each securement clip 40 has an adjustment knob 41 with a threaded stud (not shown for clarity of FIGS.) extending through a front gripping plate 43 and threadably received into a rear gripping plate 45, best seen in FIG. 4, for adjustable tightness therebetween, to permit securement and adjustability between the first bracket 14 and the second bracket 16.

A further embodiment of the adjustability arrangement comprises a plurality of longitudinally aligned, closely spaced apart holes 26' and 36', as represented in FIG. 4, instead of or in addition to the elongated slots 26 and 36 in the long legs 18 and 28, for receipt of the stud of a securement clip 40.

When it is desired to construct a stone wall 12, as represented in FIG. 5, the stone mason will typically arrange a bed or foot of the stone wall 12 and set at least a first row or course of stones horizontally therealong. By getting the first initial array of foundation type stones in a "plumb" array, by a level or plumb line or the like, as represented for a pillar 15 in FIG. 7, that plumb line or level may then be set aside and out of the way for the remaining duration of the construction. As a wall 12 is constructed, the desired width of that wall 12 is adjustably preset between the first and second brackets 14 and 16 of the tool 10, and locked into that position by the several securement clips 40 negotiated through the adjacent respective elongated securement clip receiving adjustment slot 26 in the long leg 18 of the first bracket 14 and the elongated securement clip receiving slot 36 in the long leg 28 of the second bracket 16, to its desired setting. As additional stones are set in place, the alignment tool 10 may be placed thereover, as represented in FIGS. 5 and 6, with the long legs 18 and 28 defining the horizontal top of the wall 12 being constructed. The first bracket 14 of the assembled tool 10, having its shorter side leg 20 facilitates movement and adjustment of that alignment tool 10 off and back onto the wall 12 as it is constructed. This is particularly significant as many walls may be "back filled" or obstructed during their construction process, and the fill or obstruction would get in the way of any long leg of a first bracket 14, or may otherwise be constructed close to a pre-existing fence or the like. The long side leg 30 of the second bracket 16 is placed against the front side 44 of the wall 12 being constructed, as represented in FIG. 5, to provide for proper plumb alignment of the face 44 of that wall 12.

Figure 7:
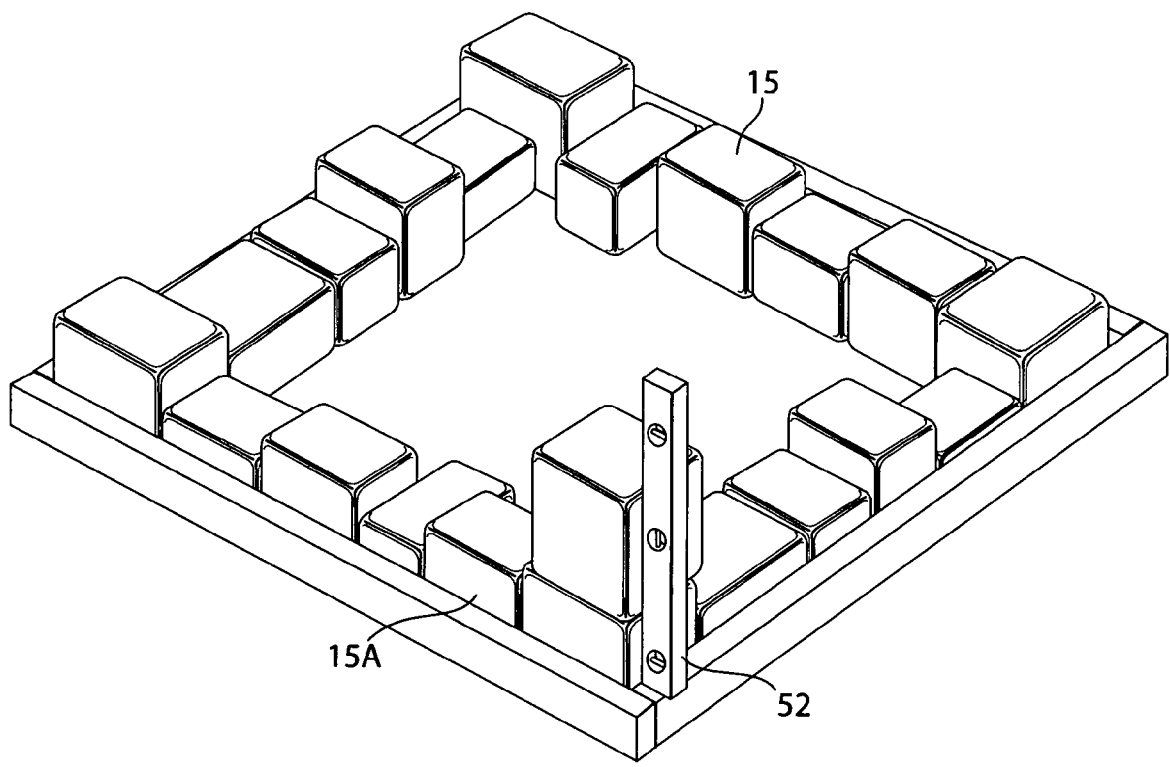
FIG. 7 is a perspective view of a wooden template arrangement for the "pre-mason's adjustable tool" use in the construction of a pillar.

Such an adjustable alignment tool may be utilized during the construction of a pillar or column of stone 15 or the like, as represented in FIG. 6. After the lower course of stones 15A is in place, and plumbed in the traditional matter with a level 52, as represented in FIG. 7, the mason's adjustable alignment tool 10 may thereafter be utilized to properly gauge the dimensions and plumbness of the pillar 15 along all four sides thereof, as represented in FIG. 6.

During its use, it is intended that the second bracket's 16 longer side leg 30 be disposed against the face side 44 of any wall 12 being assembled, as represented in FIG. 5. The long "adjustable" leg 28 of the second bracket 16 with its longer length is intended to be flush over the top surface of the stone wall 12, as it is used to plumb and align the face 44 of the wall 12, as best represented in FIG. 5.

In an assembly of a pillar 15, a single adjustable alignment bracket 10 may be also utilized to insure the conformance of the plumbness of the side walls of that pillar 15 when that alignment tool 10 is placed over the top surface of the pillar 15 as appropriate courses are laid thereon.

Thus what is shown is a unique adjustable alignment tool 10 for masons when they assemble a stone wall 10 or a stone pillar 15 while eliminating use plumb lines or plumb bobs after the first course has been laid plumb, thus saving time and minimizing complications involved with such possibly entangled lines or strings.

I claim:

1. A stone wall alignment tool arrangement for determining the plumbness of a stone wall during construction thereof, said tool comprising:

a first "L" shaped bracket having a long leg and a short side leg;

a second "L" shaped bracket having a long leg and a short side leg;

wherein said long leg of said first bracket and said long leg of said second bracket are slidably and lockingly adjustable with respect to one another, wherein said long legs are arranged to be disposed on top of a wall and said side legs are arranged to be disposed on the sides of the stone wall as a plumb alignment tool during said wall's construction;

wherein said legs of said brackets have adjustable securement means between its respective long legs to permit widthwise adjustment of said tool on a wall being constructed;

wherein each of said long legs of each of said brackets have an elongated slot arranged longitudinally therealong to permit said securement means to extend therethrough to permit dimensional adjustment and securement therebetween; and wherein each of said slots in said long legs of each of said brackets extends from a point on their long leg which is in alignment with an inside edge of their respective side leg, to a position about one inch from a distal end of their respective long leg.

* * * * *